United States Patent [19]

Oushiba

[11] 3,927,183

[45] Dec. 16, 1975

[54] METHOD FOR OXIDIZING NITROGEN OXIDES

[75] Inventor: Takashi Oushiba, Tokyo, Japan

[73] Assignee: Showa Denko Kabushiki Kaisha, Tokyo, Japan

[22] Filed: Apr. 6, 1973

[21] Appl. No.: 348,608

Related U.S. Application Data

[60] Continuation-in-part of Ser. No. 185,513, Oct. 1, 1971, abandoned, which is a division of Ser. No. 819,514, April 23, 1969, Pat. No. 3,661,512.

[30] Foreign Application Priority Data

July 4, 1968 Japan.................................. 43-46213
May 6, 1968 Japan.................................. 43-29819
Apr. 26, 1968 Japan.................................. 43-27696

[52] U.S. Cl. ................. 423/393; 423/400; 423/402
[51] Int. Cl.² .................... C01B 21/36; C01B 21/40
[58] Field of Search ........... 423/391, 393, 394, 392, 423/402, 400

[56] References Cited
UNITED STATES PATENTS

| 1,039,325 | 9/1912 | Schönherr et al. ................. 423/393 |
| 2,901,340 | 8/1959 | Semel et al. ........................ 423/393 |
| 3,211,525 | 10/1965 | Smith et al. .......................... 423/391 |
| 3,676,065 | 7/1972 | Oberste-Berghaus............... 423/393 |

FOREIGN PATENTS OR APPLICATIONS

| 25,764 | 8/1970 | Japan................................. 423/392 |

Primary Examiner—G. O. Peters
Attorney, Agent, or Firm—George B. Oujevolk

[57] ABSTRACT

Nitrogen oxides and oxygen are reacted in the presence of $KNO_3$-containing $HNO_3$ at normal room temperatures to 60°C to produce nitrogen peroxide, which, if required, is converted into nitric acid having a concentration not lower than 68%.

8 Claims, 4 Drawing Figures

METHOD FOR OXIDIZING NITROGEN OXIDES

CROSS REFERENCES TO RELATED APPLICATION:

The present application is a continuation-in-part application of the now abandoned U.S. Ser. No. 185,513 filed Oct. 1, 1971 as a divisional application of Ser. No. 819,514 filed Apr. 23, 1969, now U.S. Pat. No. 3,661,512.

BACKGROUND OF THE INVENTION

1. Field of the Invention:

Manufacture of nitric acid from a nitrogen oxides-containing gas has widely been practiced. A method using ammonia as the starting material has been particularly popular. This method comprises oxidizing ammonia to produce nitrogen oxides and converting the nitrogen oxides into nitric acid. In this case, nitrogen oxides are oxidized and then reacted upon by water to give rise to $HNO_3$. During this process, a by-product nitrogen monoxide is produced. And nitrogen monoxide (NO) which is present at a high content from the beginning in the starting material i.e., nitrogen oxides, undergoes oxidation at a relatively low rate of speed. This method, therefore, has a disadvantage that some NO tends to remain in the waste gas which occurs in the course of the manufacturing process.

2. Description of the Prior Art:

In the description to be given herein below of the present invention, the expression "strong $HNO_3$" refers to the grades of nitric acid having $HNO_3$ concentrations in the range of between 68 percent and 100 percent and the expression "weak $HNO_3$" to the grades of nitric acid having $HNO_3$ concentrations not higher than 68 percent. These concentrations are indicated solely with respect to the proportions of $HNO_3$ and water, irrespectively of any other possible coexistent substances such as, for example, $KNO_3$. The expression "nitrogen oxides" refers to a mixture consisting of nitrogen monoxide, dinitrogen trioxide, nitrogen peroxide, dinitrogen tetraoxide, and so on. "$NO_2$" means nitrogen peroxide, dinitrogen tetraoxide or a mixture thereof.

In the conventional method for the production of $HNO_3$, the production of $HNO_3$ is by the reaction of $NO_2$, water and oxygen. According to this method, the highest $HNO_3$ concentration that can be achieved by any commercial equipment is about 55 percent. It has been extremely difficult to manufacture $HNO_3$ with higher concentrations, particularly strong $HNO_3$ having concentrations exceeding 68 percent, directly by this method. A method has been suggested whereby strong $HNO_3$ having a concentration not lower than 99% is produced by causing liquid $NO_2$, oxygen and water to react for about four hours under a pressure of about 50 kg/cm². The reaction conditions required in this method seem to be too severe to render the method commercially practicable.

Usually, strong $HNO_3$ is obtained by first preparing weak $HNO_3$ of a concentration of about 55 percent as described above and subsequently concentrating the weak $HNO_3$ by distillation to a desired concentration.

At the level of 68 percent, $HNO_3$ forms an azeotrope, which cannot be concentrated any further by the ordinary technique of fractional distillation. To obtain a strong nitric acid, therefore, it is the general practice to incorporate various additives for modifying the partial pressures of the components of this azeotrope so as to withdraw from the azeotrope the vapor of strong $HNO_3$ having a high concentration, which is subsequently subjected to rectification to produce a strong $HNO_3$.

U.S. Pat. No. 3,211,525, for example, discloses that incorporation of $KNO_3$ as an additive which upsets the azeotropic state and, consequently, facilitates the formation of the vapor of strong $HNO_3$. What is disclosed by this patent concerns a method for the concentration of weak $HNO_3$ and does not teach the manufacture of strong $HNO_3$ from $NO_2$, oxygen and water. It is believed that, according to any ordinary method, $HNO_3$ is produced by the reactions which are represented by the following formulas:

$$NO + 1/2.O_2 = NO_2 \qquad (1)$$

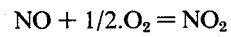

$$3NO_2 + H_2O = 2HNO_3 + NO \qquad (2)$$

The vapor-phase oxidation of NO in Formula (1) occurs at a relatively low rate as mentioned above. When the reaction temperature is elevated, the equilibrium is reversed and the reaction velocity is lowered further. It is, therefore, desirable to have the reaction performed at as low a temperature as permissible. For all the efforts, it is difficult to effect thorough oxidation of the whole NO present in the raw material gas. Even by the use of a multiplicity of absorption columns or of an absorption column with large dimension, the waste gas from the process inevitably entrains NO. The NO which is discharged at this stage has an extremely small degree of solubility in water as compared with other nitrogen oxides. If it is liberated into the atmosphere, the NO gas converts itself into $NO_2$ which forms one cause for the atmospheric pollution. Thus, there has been a need for a means which expedites the oxidation of nitrogen oxides.

SUMMARY OF THE INVENTION:

It is an object of this invention to oxidize $NO_2$-containing nitrogen oxides under mild conditions in the presence of $KNO_3$-containing $HNO_3$ as a reaction medium so as to have the said nitrogen oxides oxidized into $NO_2$ at a heightened reaction velocity.

It is another object of this invention to produce a strong $HNO_3$ directly from nitrogen oxides, oxygen and water by using $KNO_3$-containing $HNO_3$ as the contact medium. The present invention is based on a discovery that nitrogen oxides, particularly NO, are oxidized into $NO_2$ at a heightened reaction velocity even under very mild reaction conditions if $KNO_3$-containing $HNO_3$ is used as the contact medium.

It has additionally been discovered that a strong $HNO_3$ with a higher concentration than the azeotrope can easily be produced without the reaction involving application of high pressure or incorporation of a stage of distillation, only if water is supplied to the reaction system simultaneously with the progress of the reaction.

The construction of the present invention will be described to further depth herein below.

The contact medium for use in the present invention is $HNO_3$ having $KNO_3$ dissolved therein. In this case, the concentration of $HNO_3$ in the medium has an effect upon the speed at which nitrogen oxides are oxidized. Specifically, the reaction velocity increases with the increasing $HNO_3$ concentration of the medium. For this reason, the $HNO_3$ concentration is desired to be as high as permissible. It is evident from Formula (2), however, that if $HNO_3$ has a concentration beyond a certain level, it acts to oxidize NO, a compound which is intended to be oxidized by oxygen, and dissociates itself into $NO_2$ and $H_2O$. Accordingly, $HNO_3$ cannot be concentrated beyond this level. This level is variable with such factors as $KNO_3$ concentration, partial pressure of oxygen, partial pressure of nitrogen oxides, reaction temperature and reaction pressure. It is affected particularly heavily by the $KNO_3$ concentration. In the case of a saturated system, the nitric acid concentration can be heightened to the maximum of 80% or more.

Even if the $HNO_3$ concentration of the medium is extremely low at the outset of the reaction, it will reach a constant level in the course of the reaction and will, if other conditions are kept unaltered, remain at this constant level throughout the rest of the reaction.

The $KNO_3$ concentration is the most important factor in the present invention. It is closely related with the speed with which oxygen is consumed for the formation of $HNO_3$ in the reaction of Formula (3).

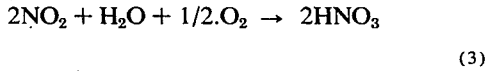

$$2NO_2 + H_2O + 1/2.O_2 \rightarrow 2HNO_3 \quad (3)$$

Roughly, the rate of oxygen consumption is linearly proportional to the $KNO_3$ concentration. It follows that the concentration of the resultant $HNO_3$ increases with the increasing $KNO_3$ concentration in the medium. Accordingly, the oxidizing speed of nitrogen oxides is increased proportionally. As a natural consequence, the concentration of the resultant strong $HNO_3$ is heightened if the strong $HNO_3$ is the product aimed at by the reaction. NO is oxidized by the strong $HNO_3$ so that the reaction of Formula (2) proceeds very rapidly in the reversed direction as indicated below.

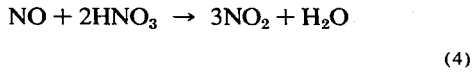

$$NO + 2HNO_3 \rightarrow 3NO_2 + H_2O \quad (4)$$

In the said reaction, $HNO_3$ in the contact medium is diluted with the water being produced by this reaction, with the result that the $NO_2$ concentration in the reaction system is conversely increased. The equilibrium constant for the reaction indicated above is such that the reaction is reversed to proceed to the right when the nitric acid concentration reaches about 68 percent. This reaction tends to proceed to the left when the $HNO_3$ concentration is lower than 68 percent. If the oxidation of NO is effected by the use of a concentrated nitric acid, it becomes necessary to maintain a continuous supply of strong $HNO_3$ to the reaction system.

If $KNO_3$ is present in the concentrated nitric acid, then the reaction of Formula (3) easily proceeds even when the nitric acid concentration is higher than 68 percent. In this case, since the nitric acid concentration can be maintained beyond the minimum level required for the reaction of Formula (4), there is no need for supplying concentrated nitric acid to the reaction system from any external source. That is, the reactions of Formulas (3) and (4) can be effected simultaneously in the presence of $KNO_3$-containing $HNO_3$. It is quite apparent that in the reaction of Formula (3), the speed of $HNO_3$ formation increases with the decreasing $HNO_3$ concentration of the medium where other conditions remain unaltered and that, in the reaction of Formula (4), the reaction itself is enhanced with the increasing $HNO_3$ concentration. This means that the optimum $HNO_3$ concentration required for obtaining the highest reaction velocity depends on such factors as $KNO_3$ concentration, partial pressure of oxygen, partial pressure of nitrogen oxides and reaction temperature. The reaction velocity is lowered, however, when the $HNO_3$ concentration exceeds or falls short of this optimum concentration. If the $KNO_3$ concentration is sufficiently high, then the point at which the two reactions proceed at an equal speed, namely the point for the maximum reaction velocity, generally occurs where the $HNO_3$ concentration is in the neighborhood of about 80 percent.

DETAILED DESCRIPTION OF THE INVENTION

Figure 1:
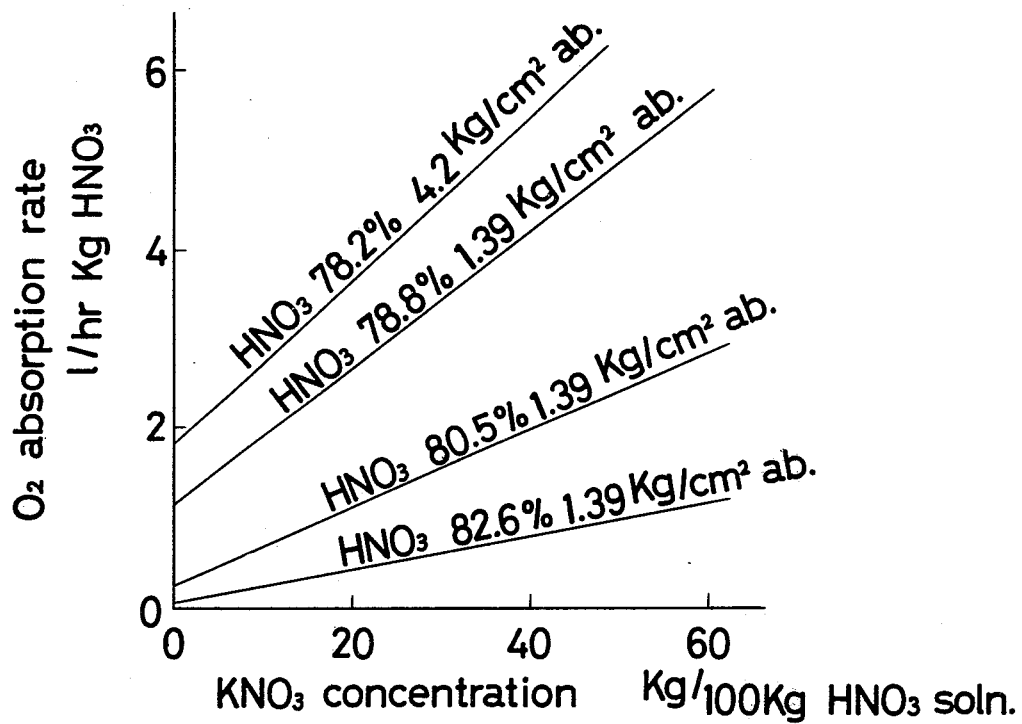
FIG. 1 is a graph illustrating the effect of $KNO_3$ concentration on the reaction velocity.

FIG. 1 illustrates the effect which the $KNO_3$ concentration of the medium has upon the speed of $HNO_3$ formation (in terms of oxygen absorption rate). For the reason given above, it also indicates the approximate reaction velocity of nitrogen oxides.

If nitrogen oxides are oxidized where $HNO_3$ and $KNO_3$ are kept under constant concentrations, then $NO_2$ is gradually accumulated in the contact medium. This accumulation of $NO_2$ has very little effect upon the reaction of Formula (2) (or the reversed reaction indicated by Formula (4) but rather causes the equilibrium of the reaction of Formula (3) to be shifted to the right side. As an overall effect, therefore, it essentially tends to increase the reaction velocity and does not decrease it in any way.

It is true that $KNO_3$ decreases the oxidation activity of $HNO_3$ to a certain extent. However, incorporation of $KNO_3$ to the contact medium is absolutely essential in consideration of the necessity for maintaining the $HNO_3$ concentration.

Since the highest $HNO_3$ concentration that can be achieved is raised by increasing the $KNO_3$ concentration, the accumulation of $KNO_3$ in the medium has the effect of enhancing the overall reaction velocity. This effect is conspicuous when $KNO_3$ is present on the order of 10% in the medium as compared with the medium incorporating no $KNO_3$. Preferably, the reaction medium should be prepared so that $KNO_3$ will remain therein in a substantially saturated condition. $KNO_3$ crystals may be present in a suspended state in the medium so far as there is no possibility of the crystals clogging the reaction system in use. The solubility of $KNO_3$ at 25°C, for example, is 40 g/100 g of 69 percent $HNO_3$, 60 g/100 g of 82 percent $HNO_3$ and 80 g/100 g of 91 percent $HNO_3$ respectively. Since the solubility is related to the concentration of the strong $HNO_3$ in use, $KNO_3$ which is in the form a slurry at the outset of reaction will gradually form a homogeneous solution with the progress of the reaction.

As the sources of nitrogen oxides to be used as the starting material, different types of gases are available. Examples are a nitrogen oxides-containing gas which is obtained by the vapor-phase oxidation of ammonia, a waste gas which is formed in the treatment of metals with $HNO_3$ and a waste gas from boilers. These gases contain nitrogen oxides at varying concentrations, ranging from an extremely low concentration to a considerably high concentration. With any of these gases, the method of this invention provides satisfactory results. A probable cause for this is that strong $HNO_3$ is an extremely good solvent for $NO_2$.

A phenomenon peculiar to the present invention is that the speed of oxygen consumption increases when $NO_2$ is dissolved in a large quantity in the contact medium. In an ordinary case, when $NO_2$ which is the oxidation product of nitrogen oxides is not removed from the reaction system, the reaction proceeds predominantly in the reversed direction and such increase in the reversed reaction manifestes itself apparently as a decline in the overall reaction velocity. In the case of this invention, an excess $NO_2$ in the medium, similarly to $KNO_3$ present in the medium, is a factor contributing to elevating the highest $HNO_3$ concentration that is achieved by the reaction under review. This fact seems to explain why the oxidation of NO is accelerated in proportion as the concentration of the produced $HNO_3$ is heightened.

Where the quantity of nitrogen oxides to be fed is small, $NO_2$ dissolved in the contact medium may be allowed to remain in the didsolved state. If the quantity of nitrogen oxides to be treated is large, it is desirable from the standpoint of heightening the overall reaction velocity to raise the $NO_2$ concentration in the reaction system by taking the necessary step of incorporating $NO_2$ into the system as, for example, by delivering $NO_2$ from the subsequent stage of bleaching.

In nearly all cases, the molecular oxygen which is contained in the nitrogen oxides-containing gas suffices as the oxygen source. If occasion demands, air or some other oxygen-containing gas may be introduced into the reaction system. The total oxygen is required to be at least in a stoichiometric amount necessary for the oxidation of nitrogen oxides. It may be such as to give an ample excess.

Where nitrogen oxides are treated for the purpose of producing strong $HNO_3$, it is desirable to introduce a stoichiometric amount of water with respect to the amount of nitrogen oxides to be supplied for the treatment. If the amount of water thus supplied falls short of the stoichiometric amount, then the water present in $KNO_3$-containing $HNO_3$, the contact medium, is consumed so that the $HNO_3$ concentration of the medium is heightened proportionally. If the reaction is continued in this state, $HNO_3$ reaches a constant concentration and can no longer produce strong $HNO_3$ having a concentration higher than the said constant level, with the result that $NO_2$ is formed in conjunction with nitric acid. In this case, the equilibrium concentration of $HNO_3$ is governed by nitrogen oxides concentration, $KNO_3$ concentration, and pressure and temperature of the reaction system. If the amount of water thus supplied is stoichiometric with respect to that of nitrogen oxides, then the $HNO_3$ concentration of the contact medium remains unchanged and has no apparent bearing upon the reaction. Accordingly, all the nitrogen oxides to be supplied are wholly converted to $HNO_3$.

It may readily be understood from the preceding explanation that if the amount of water to be suppled is excessive, it will cause a decline in the $HNO_3$ concentration of the $KNO_3$-containing $HNO_3$ medium.

Where the concentration of the produced $HNO_3$ does not matter in particular, the desired strong $HNO_3$ can be obtained all the same by making intermittent supply of water.

In case where no supply of water is made for the reaction system, the $HNO_3$ concentration in the contact medium first changes to eqilibrium concentration which continues thereafter throughout the rest of the reaction, so that nitrogen oxides are oxidized solely into $NO_2$ and apparently do not induce any formation of $HNO_3$. At this point, liquid dinitrogen tetraoxide can easily be recovered in high yields by separating from the reaction system the formed $NO_2$ as by the bleaching process and then cooling the separated $NO_2$.

The speed at which nitrogen oxides are oxidized is also affected by the reaction pressure and reaction temperature. The reaction velocity increases with the increasing reaction pressure. The effect of the reaction pressure on the reaction velocity, however, is small compared with other factors such as, for example, $HNO_3$ concentration and $KNO_3$ concentration of the contact medium. The effect of an increased reaction pressure is relatively small for the expense required to increase the reactor's strength for withstanding such increased pressure. For this reason, it is desirable to limit the reaction pressure within the maximum of about 15 kg/cm². The reaction can be carried out under normal pressure so far as the waste gas from the reactor can sufficiently be scrubbed. In this respect, therefore, the equipment required for the reaction may prove to be most inexpensive.

The rise of reaction velocity due to the increase in the raction temperature is also relatively small. The apparent reaction velocity is raised very little when the reaction temperature is elevated over 60°C. Thus, the preferably range of reaction temperatures is between normal room temperatures and 60°C. Such insignificant response of reaction velocity to the increase in the reaction temperature may be ascribable to the change of the equilibrium of reaction of Formula (1) and the decrease in the solubility of nitrogen oxides and oxygen in the contact medium.

As is clear from the preceding explanation, the contact medium to be used in the present invention markedly accelerates the oxidation of nitrogen oxides and consequently enables $NO_2$ or strong $HNO_3$ to be produced with extreme ease.

According to the present invention, NO which is extremely difficult of removal can be converted into $NO_2$ even when no supply of water is made to the reaction system, so that the produced $NO_2$ may easily be removed by washing with water or by liquefaction at lowered temperatures. Where there is available a simple cooling device, therefore, the method of this invention can be utilized for the production of liquid $N_2O_4$.

If water is supplied to the reaction system, the present invention permits production of $KNO_3$-containing strong $HNO_3$. This product can be lent in its unmodified state, as proposed by U.S. Patent No. 3,661,512, to the production of $KNO_3$ and chlorine by the reaction thereof with KCl.

Otherwise, the strong $HNO_3$ can be obtained in a pure form directly from this product by depriving the product of the $KNO_3$ component by means of distillation. Where the contact medium is saturated with $KNO_3$ or it contains $KNO_3$ close to a saturation point, the $HNO_3$ concentration can easily be increased to 80% or over simply by distillation. By repeated distillation, the concentration can easily be heightened to 100%.

Figure 2:
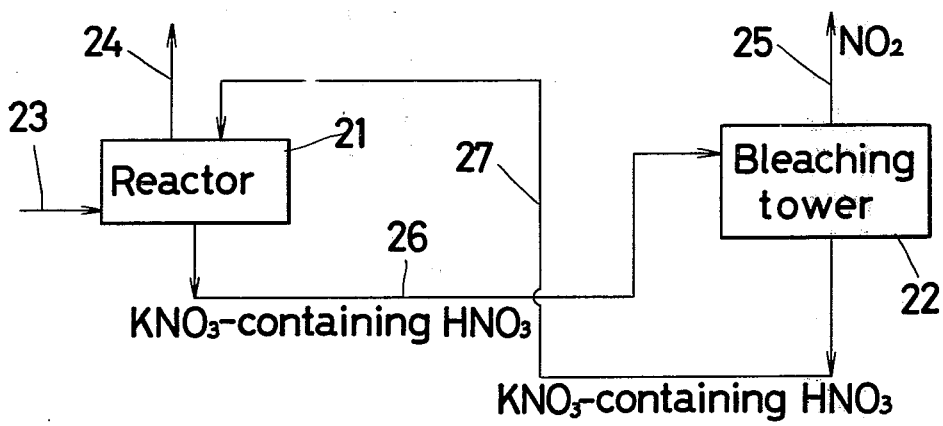
FIG. 2 is a flow-sheet illustrating one preferred embodiment of the device for practicing the method of this invention for the production of $NO_2$.

In carrying the invention into practice as shown in FIG. 2, $KNO_3$-containing $HNO_3$ is introduced via a line 27 into a reactor 21. A nitrogen oxides-containing gas is introduced via a line 23 to the bottom of the reactor 21 so as to ascend in the form of fine bubbles through the $HNO_3$. Desirably the reaction temperature is maintained in the range between normal room temperature and 60°C. The contact medium strips the gas of the entrained nitrogen oxides and the gas which is now free from nitrogen oxides is released via a line 24. As the reactor for this purpose, any of the devices such as nonpacked column, plate tower, bubble cap tower and packing tower which are usable for vapor-liquid contact may be utilized. The contact medium which has had $NO_2$ dissolved therein in consequence of the reaction is withdrawn through a line 26 out of the bottom of the reactor 21 and then fed into a bleaching tower 22 downwardly from the top. Within this tower 22, the contact medium is heated to its boiling point of 80°C so that the dissolved $NO_2$ is driven out to be discharged through a line 25. The $NO_2$ thus liberated may be separated in the form of liquid $N_2O_4$ by means of a cooling device or it may be suitably disposed of as a raw material.

From the bottom of the bleaching tower 22, the $KNO_3$-containing $HNO_3$ which has already been bleached is withdrawn. This is cooled and recycled to the reactor 21. This bleaching process may otherwise be effected by having air or some other inert gas introduced via the bottom of the bleaching apparatus to be bubbled through the medium contained therein. The said heating and the introduction of inert gas may be practiced in combination if required. Where air is introduced, the gas which has been stripped of $NO_2$ is desirably recycled to the reactor 21 for recovery of residual $NO_2$. In the case of an operation in which the amount of nitrogen oxides to be introduced is large, it is desirable that a part of the gas in a line 25 is returned to the line 26 so as to heighten the $NO_2$ concentration in the reactor 21.

Figure 3:
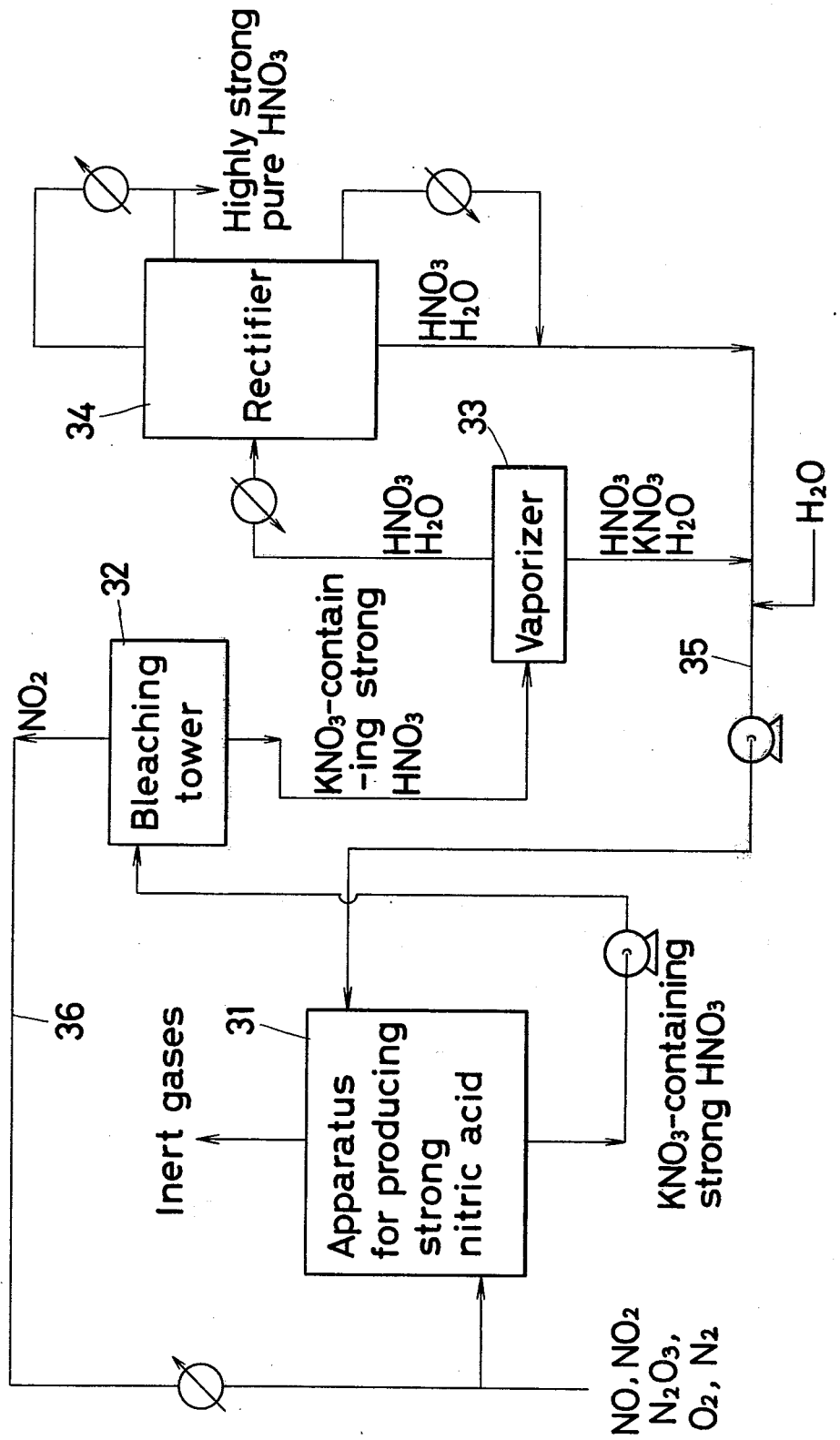
FIG. 3 is a flow-sheet illustrative of one preferred embodiment of the device for practicing the method of this invention for the production of strong nitric acid.

Another preferred embodiment of the present invention is illustrated in FIG. 3. Referring to FIG. 3, $KNO_3$-containing nitric acid is placed in a strong $HNO_3$ producing apparatus 31 and a nitrogen oxides-containing gas is introduced in the form of fine bubbles upwardly into the said apparatus 31 so as to effect the reaction. The $KNO_3$-containing strong $HNO_3$ which is produced consequently is placed in the bleaching tower 32 and heated at about 80°C to have the dissolved $NO_2$ separated therefrom. The $NO_2$ consequently drawn off in the form of vapor is recycled via the line 36 to the apparatus 31.

The $KNO_3$-containing strong $HNO_3$ which remains in the bleaching tower 32 is transferred to the vaporizer 33 wherein it is converted into the vapor of pure nitric acid. The vapor is sent to the rectifier 34 to be converted into highly pure, strong nitric acid. The nitric acid remaining in the rectifier 34 and the vaporizer 33 is recycled via the line 35 to the apparatus 31. The water which is required for the reaction in the production of strong $HNO_3$ must be added to the reaction system via the line 35 or into the apparatus 31. As is clear from the foregoing explanation, the method of this invention is much simpler to practice than any of the conventional methods and permits direct production of liquid $N_2O_4$ or highly pure nitric acid.

The following examples are further illustrative of the present invention and they are not to be considered as limiting the present invention.

EXAMPLE 1:

This example covers a process which utilized the device of FIG. 2. A raw gas 23 was blown into a reactor 21 at a flow volume of 100 m³/hr. The raw gas was composed of 1.5 percent of NO, 8.3 percent of $NO_2$, 20.6 percent of $O_2$ and 69.6 percent of $N_2$. The reactor contained plates and was operated under a pressure of 4 kg/cm² at a temperature of 30°C. Through the top of the reactor, a $KNO_3$-containing $HNO_3$ solution (composed of 54.9% of $HNO_3$, 10.5% of $H_2O$ and 34.6% of $KNO_3$) was introduced via a line 27 at a rate of 300 kg per hour so as to effect counterflow reaction thereof with the raw gas. The liquid withdrawn via the bottom of the reactor was transferred via a line 26 to a bleaching tower 22, wherein it was heated to about 100°C to separate the dissolved $NO_2$ by vaporization. Thereafter, the liquid thus treated was recycled via the line 27 to the reactor.

The gas ascending to the top of the reactor was found to be composed of less than 10 ppm of $NO_2$, 22.2% of $O_2$ and 77.8% of $N_2$ and substantially no NO.

The $NO_2$ collected in the bleaching tower was cooled to 10°C to obtain nitrogen peroxide at a rate of 20 kg per hour.

EXAMPLE 2:

FIG. 3 is a schematic diagram illustrating the process flow of the present example. About 13,052 Nm³/hour of a gas (composed of 11.5% of NO, 6.6% of $O_2$, 81.2% of $N_2$ and 0.7% of $H_2O$ by molar ratio) resulting from the air oxidation of ammonia, about 432 Nm³/hour of 99.5% industrial-grade oxygen and $NO_2$ recycled via a line 36 from a bleaching tower 32 were mixed and introduced under pressure via the bottom of a strong $HNO_3$ producing apparatus.

The apparatus 31 was operated under a pressure of 10 kg/cm² at a temperature of 30 °C. Through the top of this reactor, about 81,875 kg/hour of a contact medium, namely $KNO_3$-containing $HNO_3$ (composed of 54.5% of $HNO_3$, 10.5% of $H_2O$, 35% of $KNO_3$ by weight ratio; the $HNO_3$ concentration being 83.8% and the $KNO_3$ concentration being 53.8 g/100 g of the whole solution) and replenishing water were introduced via a line 35. The contact medium and the water were brought into thorough contact with the raw gas. The residual gas from the reaction (composed of 0.1% of $NO_2$, 0.2% of $HNO_3$, 0.0% of $H_2O$, 98.2% of $N_2$, 1.5% of $O_2$ by molar ratio) and an undetectable amount of NO was discharged via the top of the apparatus 31 at a rate of about 10,792 Nm³/hour.

The contact medium which had fallen to the bottom of the apparatus 31 was transferred from the bottom to a bleaching tower 32. The bleaching tower 32 was operated under normal pressure at a temperature of 125°C, so that the contact medium was stripped of the dissolved $NO_2$ at a rate of about 5,736 kg per hour. The $NO_2$ thus separated was recycled to the apparatus 31.

The contact medium discharged from the bleaching tower 32 was composed of 56.7% of $HNO_3$, 10% of $H_2O$) and 33.3% of $KNO_3$ by weight ratio (the $HNO_3$ concentration being 85% and the $KNO_3$ concentration being 50 g/100 g of $HNO_3$ solution). It was discharged at a rate of about 86,042 kg/hour.

In a vaporizer 33, the said contact medium was stripped of a part of $HNO_3$ by vaporization. The vapor of $HNO_3$ was forwarded to a rectifier 34. Through the top of the rectifier, 4,167 kg/hour of 99% $HNO_3$ was obtained.

The residual liquid in the vaporizer 33 and the high boiler in the rectifier 34 were combined and the resultant mixture was recycled in conjunction with about 5,736 kg/hour of replenishing water via a line 35 to the apparatus 31.

Figure 4:
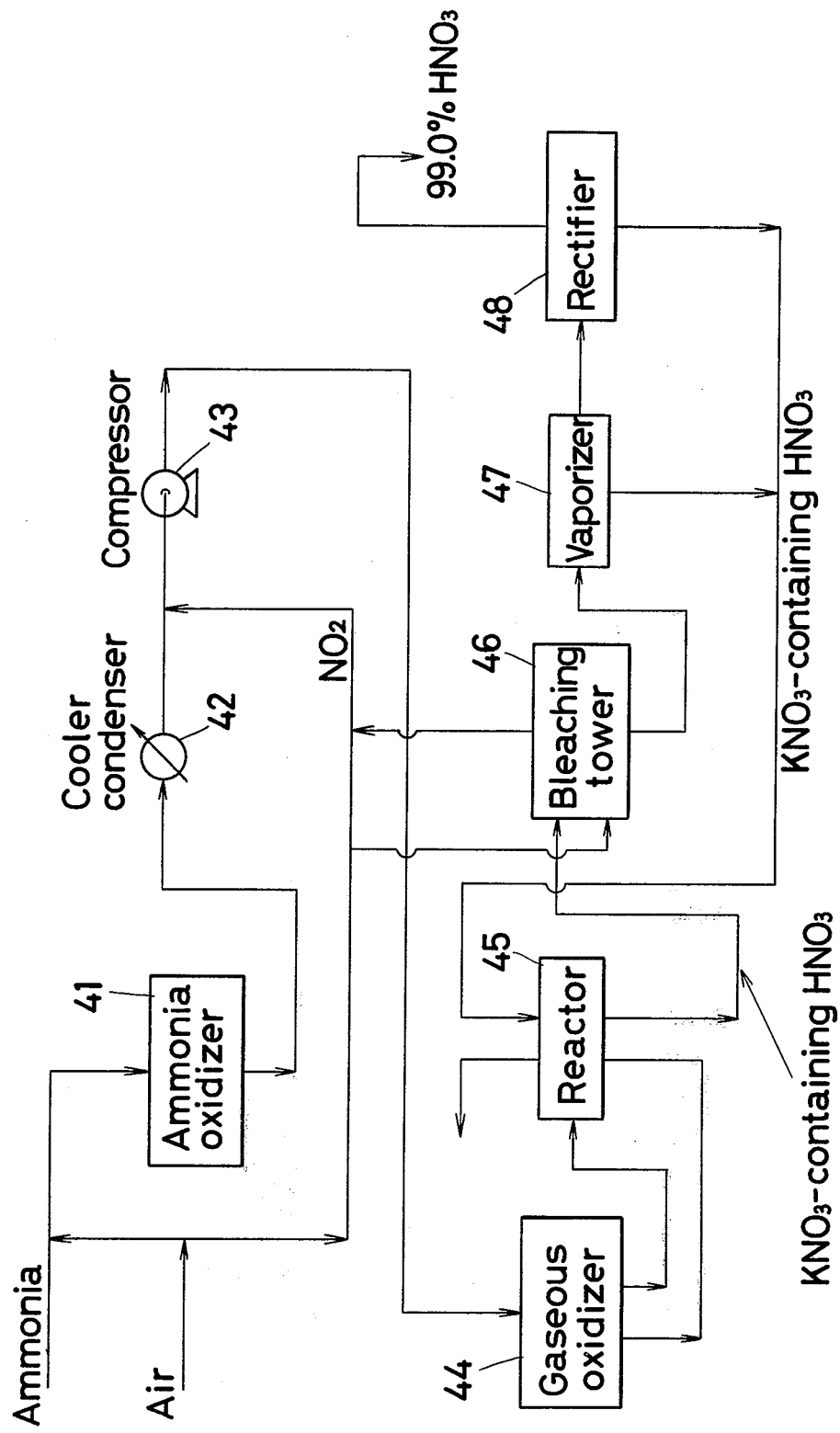
FIG. 4 is a flow-sheet illustrating one preferred embodiment of the device for practicing the method of this invention for the production of strong nitric acid from ammonia. This device is substantially the same as that of FIG. 2, with the exception of the nitrogen oxide-producing process.

EXAMPLE 3:

FIG. 4 is a schematic diagram illustrating the process flow of the present example. In an ammonia oxidizer 41, 119 kg/hour of ammonia and 1,397 $Nm^3$/hour of air were brought into intimate contact under normal pressure in the presence of a platinum-rhodium platinum catalyst to effect catalytic oxidation of ammonia. A total of 1,593 $Nm^3$/hour of a gas (composed of 9.6% of NO, 66.5% of $N_2$, 5.5% of $O_2$ and 18.5% of $H_2O$ by voluminal ratio) was discharged from the oxidizer 41. The gas was cooled to 34°C in a cooler condenser 42 to separate therefrom 187 kg/hour of by-produced water (as 3.1% nitric acid). The gas which had been removed of the by-produced water was mixed with 97 $Nm^3$/hour of the recycle gas containing 69.03 vol% of $NO_2$ and being returned from a subsequent bleaching tower 46 and 258 $Nm^3$/hour of secondary air. The resultant mixed gas was compressed to 13 $kg/cm^2$abs. by means of a compressor 43. The compressed mixed gas was cooled and then, in a gaseous oxidizer 44, deprived of 50% nitric acid at a rate of 121 kg/hour. Consequently, there was obtained 1,497 $Nm^3$/hour of mixed gas (composed of 1.0% of NO, 1.48% of $NO_2$, 7.71% of $N_2O_4$, 0.01% of $HNO_3$, 0.27% of $H_2O$, 84.87% of $N_2$ and 4.67% of $O_2$ by volume ratio). This mixed gas was blown into the reactor 45 through the bottom. Via the top of the reactor 45, 3,691 kg/hour of a contact medium (composed of 37.28% of $KNO_3$, 51.7% of $HNO_3$ and 10.99% of $H_2O$ by weight ratio) (the $HNO_3$ concentration being 82.5% and the $KNO_3$/$HNO_3$ ratio being 72/100 by weight) was introduced. Separately, 121 kg/hour of 50% nitric acid separated previously was downwardly introduced into the reactor 45. The reactor 45 was a tower provided on the inside with plates and designed to effect counterflow gas-liquid contact. The tower top was maintained at 35°C, the tower bottom at 45°C and the pressure at 13 $kg/cm^2$abs.

As a consequence of the reaction, 4,403 kg/hour of a liquid (composed of 53.12% of $HNO_3$, 9.37% of $H_2O$, 31.25% of $KNO_3$ and 6.25% of $N_2O_4$ by weight ratio the nitric acid concentration being 85% by weight ratio, the $KNO_3$/$HNO_3$ ratio being 58.8/100 and the $N_2O_4$/$HNO_3$ ratio being 11.0/100 respectively by weight) was withdrawn from the reactor bottom, led into the bleaching tower 46, brought into contact with 20 $Nm^3$/hour of air so as to be stripped of the dissolved $NO_2$. The resulting gas was mixed with the raw gas as described previously. The liquid discharged at a rate of 4,107 kg/hour through the bottom of the bleaching tower 46 was found to be composed of 56.5% of $HNO_3$, 10% of $H_2O$ and 33.5% of $KNO_3$ by weight ratio).

The liquid which came out of the bleaching tower was transferred to a vaporizer 47, wherein it was heated at 138°C to produce a vapor composed of 85% by weight of $HNO_3$ and the balance of $H_2O$ at a rate of 806 kg/hour. This vapor was delivered to a rectifier 48.

In the rectifier 48, 99.0% nitric acid was obtained via the tower top at a rate of 417 kg/hour.

The liquid (composed of 49.6% of $HNO_3$, 8.7% of $H_2O$ and 41.7% of $KNO_3$ by weight ratio) discharged at a rate of 3,302 kg/hour via the bottom of the vaporizer 47 and the liquid (composed of 70% of $HNO_3$ and 30% of $H_2O$ by weight ratio) discharged at a rate of 389 kg/hour via the bottom of the rectifier 48 were simultaneously returned, repeatedly and continuously, to the first reactor 45 via the top.

I claim:

1. A process for the production of nitric acid having a concentration of over 68% comprising passing a contact medium through a first zone by introducing the contact medium at the top of the first zone, bubbling nitrogen oxides and oxygen through said contact medium by introducing said nitrogen oxides and said oxygen at the bottom of the first zone, said nitrogen oxides being selected from the group consisting of nitrogen monoxide, dinitrogen trioxide and nitrogen peroxide, maintaining the first zone at a temperature between ambient temperature and about 60°C and at a pressure between ambient pressure and about 15 $kg/cm^2$, said contact medium comprising nitric acid, potassium nitrate and water, said nitric acid having a concentration less than the concentration of nitric acid produced in the process, said potassium nitrate being present in at least 10% by weight, said water being present in an amount sufficient to completely convert, together with the oxygen, the nitrogen oxides to nitric acid, withdrawing the contact medium from the first zone and feeding the contact medium now containing a more concentrated nitric acid to a second zone, heating the contact medium in the second zone to about 80°C to liberate $NO_2$ gas, transferring the contact medium to a third zone and vaporizing nitric acid to obtain said acid having a concentration of over 68%.

2. The method of claim 1 in which the vaporized nitric acid is subjected to rectification to obtain nitric acid in a concentration of 98 to 100 percent.

3. The process of claim 1 in which a portion of the contact medium is recycled from the third zone to the first zone and in which make up water is added to the recycled contact medium before it is introduced into the top of the first zone.

4. The process of claim 1 in which at least a portion of the liberated $NO_2$ gas is recycled to the bottom of the first zone.

5. A method for the oxidation of nitrogen oxide comprising passing a contact medium through a first zone by introducing the contact medium at the top of the first zone, bubbling nitrogen oxides and oxygen through the contact medium by introducing the nitrogen oxides and oxygen at the bottom of the first zone, said nitrogen oxides being selected from the group consisting of nitrogen monoxide and dinitrogen trioxide, maintaining the first zone at a temperature between ambient temperature and about 60°C and at a pressure between ambient pressure and about 15 $kg/cm^2$ so that the contact medium absorbs the nitrogenoxides and oxygen, said contact medium comprising nitric acid and potassium nitrate, said potassium nitrate being present in at least 10 percent by weight, withdrawing the contact medium now enriched by oxidized nitrogen oxides from the first zone and feeding the now enriched medium to a second zone, and heating the enriched contact medium in the second zone to about 80°C to liberate the oxidized nitrogen oxides gas.

6. The process of claim 5 in which the oxidized nitrogen oxides gas is cooled to form a liquid which is recovered.

7. The process of claim 5 in which the enriched contact medium is recycled to the top of the first zone after the oxidized nitrogen oxides gas is liberated.

8. The process of claim 5 in which a portion of the liberated oxidized nitrogen oxides gas is recycled to the bottom of the first zone.

* * * * *